United States Patent [19]
Jervis

[11] Patent Number: 5,111,001
[45] Date of Patent: * May 5, 1992

[54] SPLICE CASE

[75] Inventor: James E. Jervis, Atherton, Calif.

[73] Assignee: Raychem Corporation, Menlo Park, Calif.

[*] Notice: The portion of the term of this patent subsequent to Aug. 22, 2006 has been disclaimed.

[21] Appl. No.: 509,041

[22] Filed: Apr. 13, 1990

[51] Int. Cl.⁵ .......................................... H02G 15/113
[52] U.S. Cl. .................................... 174/92; 174/76
[58] Field of Search ..................................... 174/92, 76

[56] References Cited

U.S. PATENT DOCUMENTS

| | | | |
|---|---|---|---|
| 3,147,338 | 9/1964 | Ekvall et al. | 174/92 |
| 3,678,175 | 7/1972 | Appiani et al. | 174/92 |
| 3,757,031 | 9/1973 | Izraeli | 174/138 F |
| 3,781,461 | 12/1973 | Thompson et al. | 174/92 X |
| 3,971,894 | 7/1976 | Faust et al. | 174/92 X |
| 4,451,696 | 5/1984 | Beinhaur | 174/92 |
| 4,610,738 | 9/1986 | Jervis | 174/76 X |
| 4,610,921 | 9/1986 | Follette | 174/88 R X |
| 4,634,207 | 1/1987 | Debbaut | 174/76 X |
| 4,692,564 | 9/1987 | Campbell et al. | 174/92 |
| 4,716,183 | 12/1987 | Gamarra et al. | 522/80 |
| 4,736,071 | 4/1988 | Hawkins et al. | 174/92 |
| 4,849,580 | 7/1989 | Reuter | 174/92 |
| 4,859,809 | 8/1989 | Jervis | 174/92 |

Primary Examiner—Morris H. Nimmo
Attorney, Agent, or Firm—A. Stephen Zavell; Herb Burkard

[57] ABSTRACT

A splice case for a telecommunications cable splice comprises first and second parts that are held together by springs that function also to deform surfaces of the parts to put a sealing material therein under compression. The splice case may contain a conductor organizer.

18 Claims, 5 Drawing Sheets

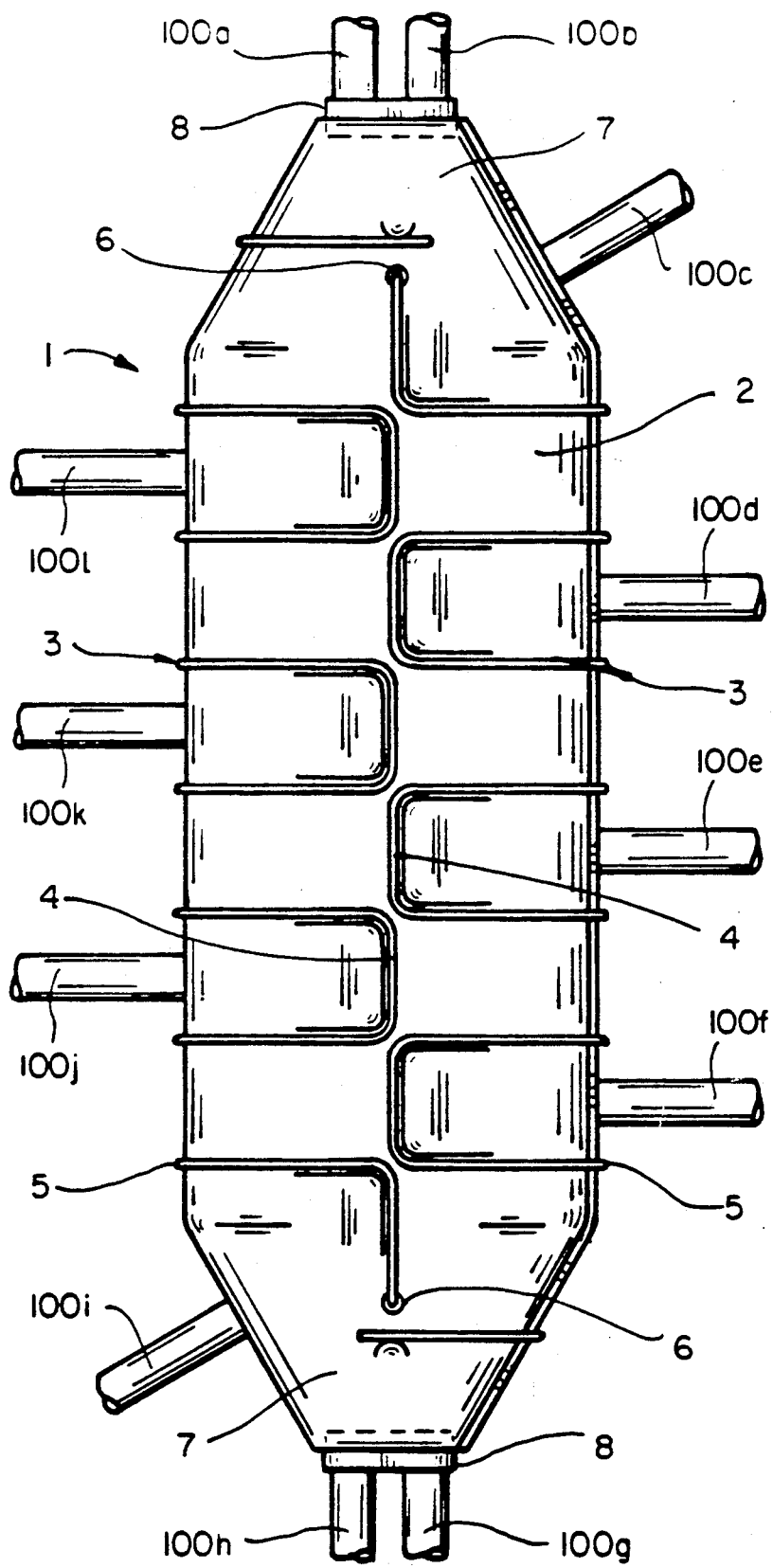
FIG_1

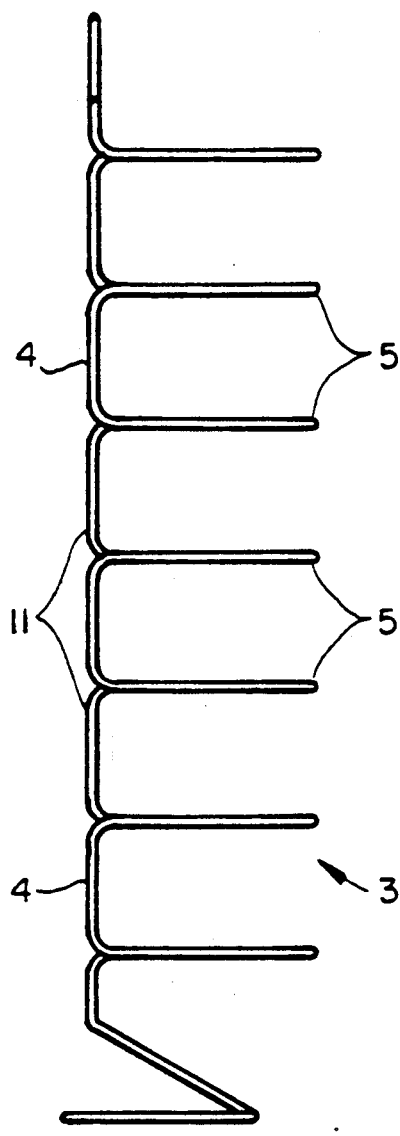
FIG_2
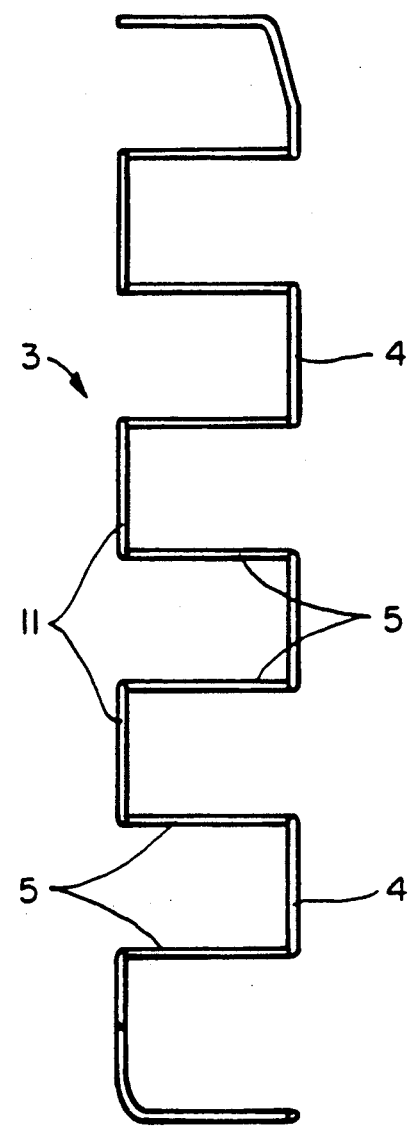
FIG_3
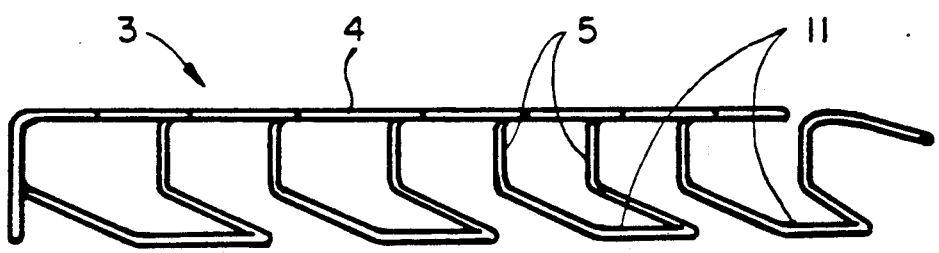
FIG_4

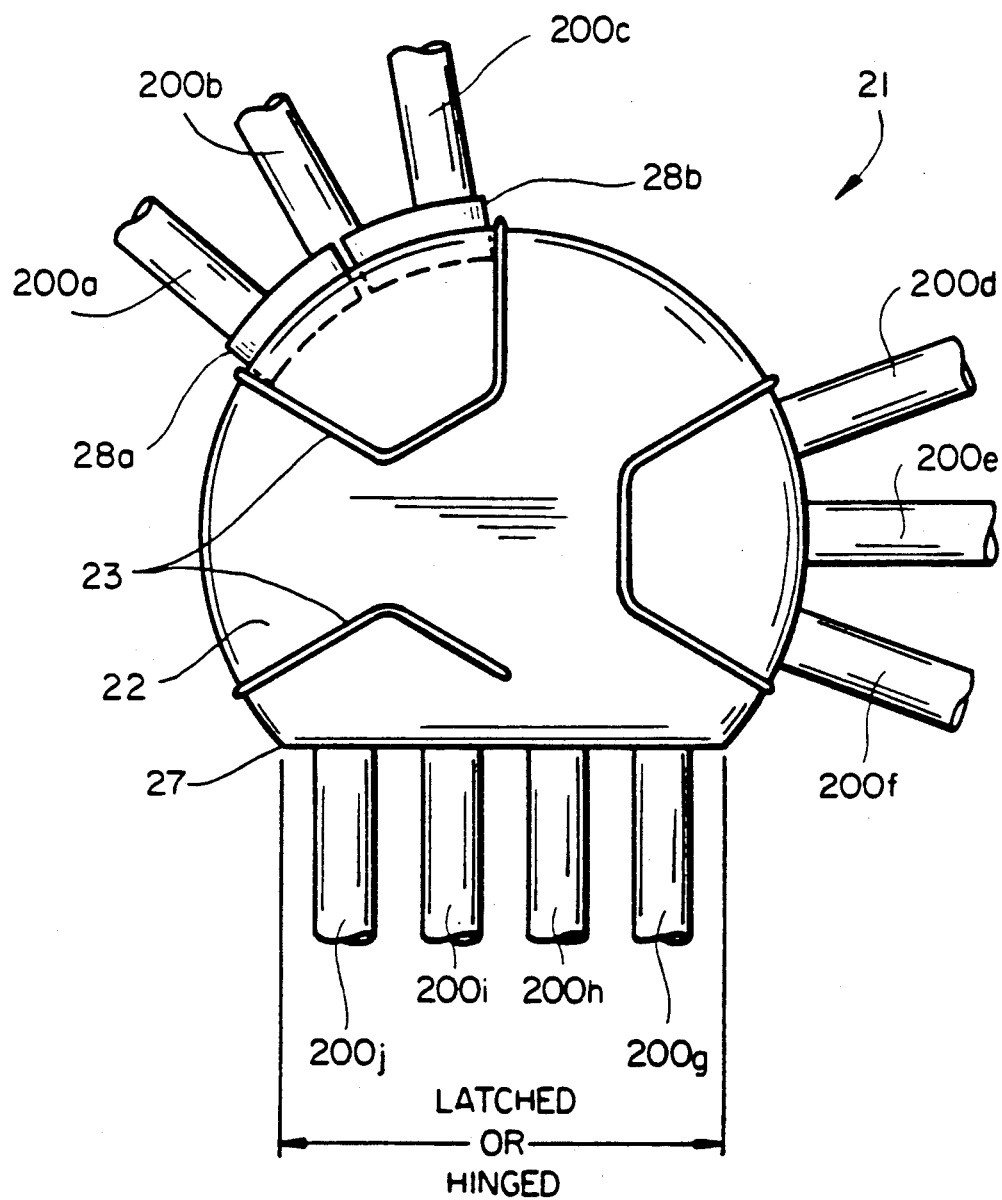
FIG_5

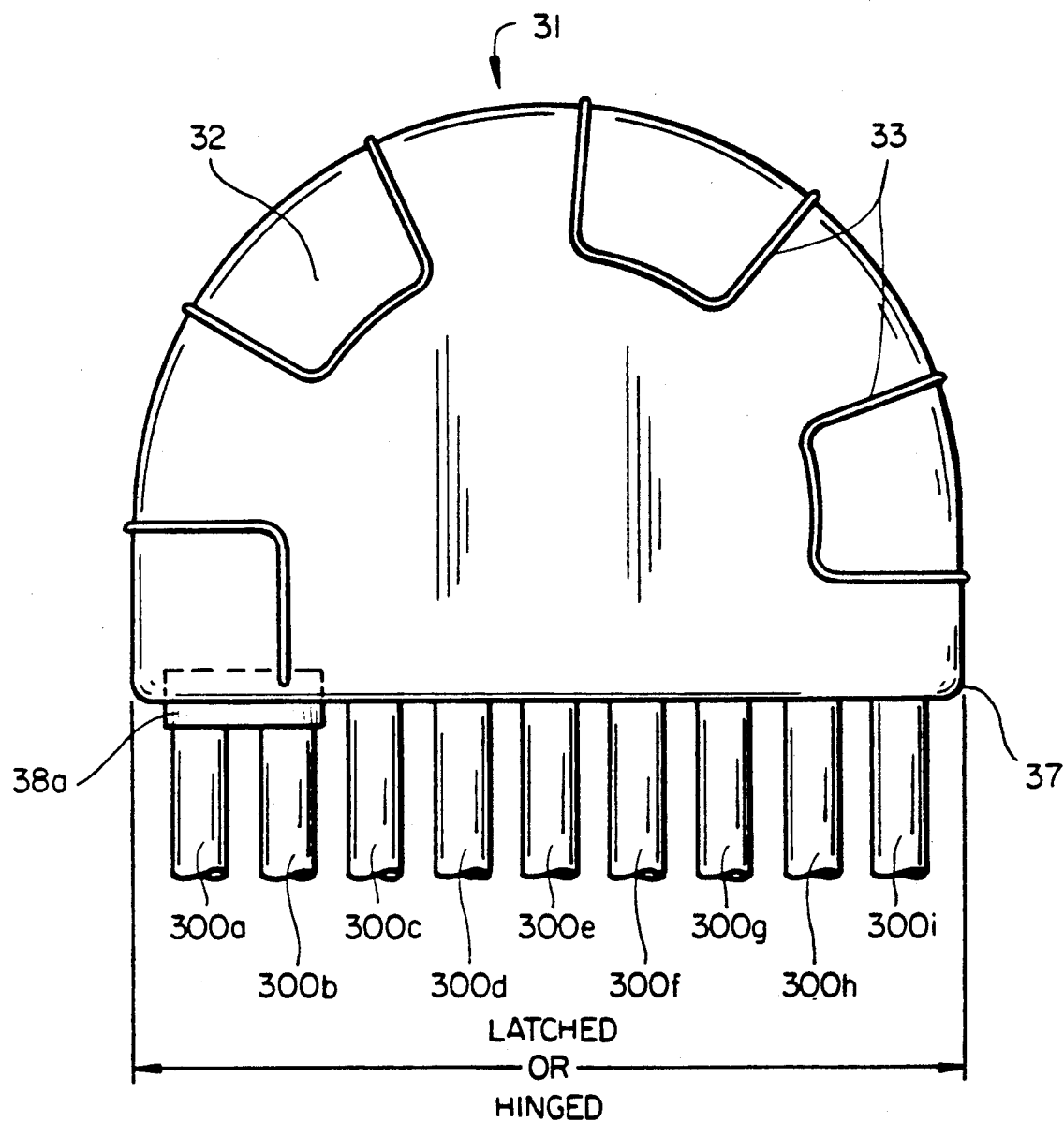
FIG_6

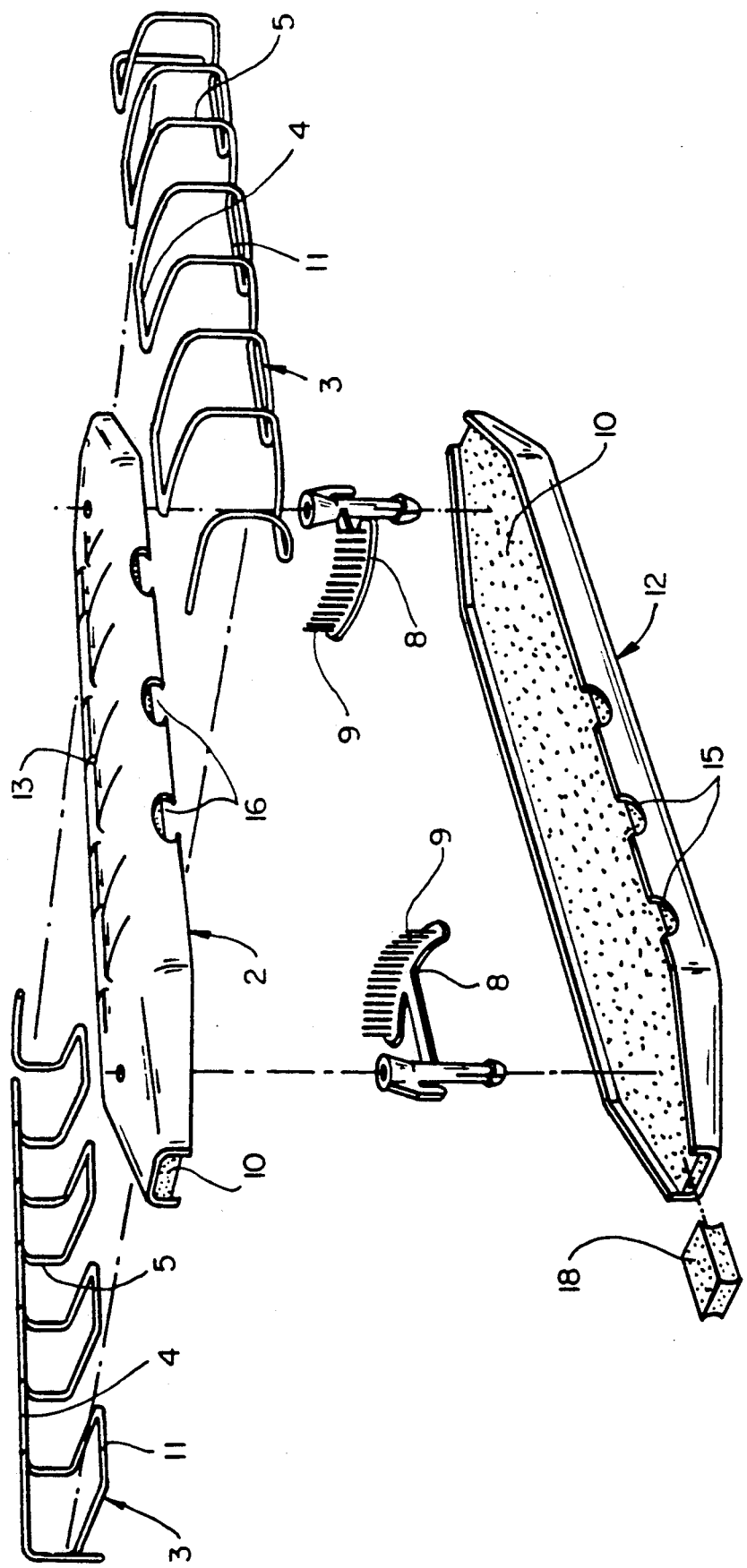

SPLICE CASE

TECHNICAL FIELD

The present invention relates to a splice case for encapsulating conductors, particularly in a telephone system, and is especially suitable for buried or other outdoor use. More specifically, the invention relates to improvements in U.S. Pat. No. 4,859,809. The complete disclosure of U.S. Pat. No. 4,859,809 is completely incorporated herein by reference for all purposes.

BACKGROUND OF THE INVENTION

It is frequently necessary to protect conductor splices from the environment in order that they may continue to function properly for a life-time that may extend to several tens of years. Thus, the splice may be encapsulated by some means, preferably in a fashion that allows easy access to the splice (known as re-entry) for repair or rearrangement of conductors without destroying the original encapsulation.

The U.S. Pat. No. 4,859,809 patent covered a splice case for sealing a conductor splice comprising a splice case for encapsulating a conductor splice, which comprises a first hollow part; a second part that can be positioned adjacent the first part such that the first and second parts together define an enclosed space; a sealing material having a cone penetration value from 100-350 ($10^{-1}$ mm) and an ultimate elongation of at least 200%, the sealing material being within the first hollow part; and a spring for forcing the first and second parts together thereby putting the sealing material under compression; the first part and/or the second part having a deformable surface, and the spring being so shaped as to cause said surface to be deformed towards the sealing material thereby putting the sealing material under compression.

The patent also covered a splice case comprising a splice case for encapsulating a conductor splice, which comprises a first hollow part; a second part that can be positioned adjacent the first part, such that the first or second parts together define an enclosed space; a second material having a cone penetration value from 100-350 ($10^{-1}$ mm) and an ultimate elongation of at least 200%, the sealing material being within the first hollow part; and a spring for forcing the first and second parts together thereby putting the sealing material under compression, the spring comprising a resilient elongate member shaped as at least three interconnected segments each segment being of re-entrant shape and comprising a first portion that can bear against a surface of the first part, a second portion that can bear against a surface of the second part, and a third portion that interconnects the first and second portions.

I have now discovered further improvements in those splice cases can be made to seal a greater plurality of wires.

SUMMARY OF THE INVENTION

My prior U.S. Pat. No. 4,859,809 shows springs whose active "C" shaped elements are transverse to the axis of the closure, and whose tips meet in a common flexure line at the axial center-line of the closure. Greater pressure may be produced by the springs if they interlock.

If the "C" sections are skewed slightly, for example, by stretching the springs axially, the tips of two adjacent springs may then be assembled more closely together, increasing the unit pressure by effectively reducing the area of the gel interface. In this manner, the gel pressure can be increased without stiffening the spring and making handling more difficult. This is advantageous since the water head resisted can then be greater for a given spring design.

Another situation often encountered in distribution plant is the need to splice several drops at one point along a main cable. My prior closures are generally intended to accommodate up to a total of four cables (depending on the specific configuration). However, more than two drops from a main cable may be accommodated by several means.

Cable blocks such as those described in U.S. Pat. No. 4,610,921 and described and claimed in U.S. Ser. No. 07/406,883 filed Sep. 13, 1989, now U.S. Pat. No. 4,944,973 are often used to prevent cable-borne water from flowing along a length of cable. The patent and application disclosures are completely incorporated herein by reference for all purposes. They can be placed anywhere in a length of cable by center-stripping the jacket, separating the individual conductors to eliminate tight interstices, and applying a closure of the present invention around the blocked cables. The gel will encapsulate the wires, and the pressure generated by the closure springs will prevent migration of cable borne water, at least to the extent the pressure generated by the springs exceeds the water head imposed. It may be necessary to employ wire organizing means if the number of wires exceeds a few.

Cable blocks are often installed at splices as well, and the previous discussion applies similarly, except that connectors must be accommodated. A useful example is where modern, plastic-insulated meets older, paper-insulated. Cable-borne water will seriously damage paper insulated cable, and therefore a water block is useful at the spliced interface.

More specifically, an "apple-core" described as element 25 in FIG. 6 of the U.S. Pat. No. 4,610,921 patent and U.S. application Ser. No. 07/406,883 can be used near the end of the cable jackets so a multiplicity of drops forms a cross section similar to that of a larger, single cable. If interstices are formed between drops such that gel would not seal the drops properly, then the "apple-core" would advantageously be formed of a sealing material, like a hard gel, for example, a cone penetration of from about 75 to about 200 ($10^{-1}$ mm) with elongation of at least about 100%.

Another means of providing for additional drops is to add cable entries at locations on the closure surface which will not interfere with the spring assembly or location. Several such locations are shown in FIG. 1. The configurations of FIG. 1 are all wrap around, and fall generally within the "in-line" or "butt" configurations originally disclosed. Since the springs are of a continuous loop form, and always assemble starting from one side, alternate loops may be used as sites for drop entries.

Other configurations are suggested in FIGS. 5 and 6. Depending on the extremes to which these configurations are carried, they may or may not be totally wrap around. FIGS. 5 and 6 depict configurations in which only a portion of the closure periphery is held together by a spring. In instances where the portion not held together by a spring is extensive it may be latched or hinged such that deformation in this section of the periphery by gel pressure will not result in opening of the closure.

Thus, the present invention provides a splice case for encapsulating a plurality of wires which comprises:
- a first hollow part;
- a second part, preferably hollow and preferably substantially identical to or substantially a mirror image of the first part, that can be positioned adjacent the first part such that the first and second parts together define an enclosed space, said first and second parts having access ports for cables in the sides perpendicular the major surfaces;
- a sealing material having a cone penetration value from 100-350 ($10^{-1}$ mm) and an ultimate elongation of at least 200%, the sealing material being within the first hollow part, and preferably where hollow also within the second part;
- a spring for forcing the first and second parts together thereby putting the sealing material under compression, where the spring engages the first and second parts, said spring permitting cables to be placed within the enclosure between a reentrant shape, bearing against the sides of the case substantially perpendicular to the major surface; and
- the first part and/or the second part having a deformable major surface, and the spring being so shaped as to cause said major surface to be deformed towards the sealing material thereby putting the sealing material under compression.

The invention also provides a splice case for encapsulating a conductor splice, which comprises:
- a first hollow part having a straight edge base capable of accepting a plurality of cables and a substantially circular arch periphery connecting the edges of the base;
- a second part, preferably hollow and preferably substantially identical to or substantially a mirror image of the first part that can be positioned within the first part such that the first and second parts together define an enclosed space;
- a sealing material having a cone penetration value from 100-350 ($10^{-1}$ mm) and an ultimate elongation of at least 200%, the sealing material being within the first hollow part, and preferably where hollow also within the second part; and
- a spring for forcing the first and second parts together thereby putting the sealing material under compression when the spring engages the first and second parts, the spring comprising a resilient elongate member shaped as at least three interconnected segments each segment being of re-entrant shape and comprising a first portion that can bear against a surface of the first part, preferably a deformable surface, and a second portion that can bear against a surface of the second part, preferably a deformable surface, and a third portion that interconnects the first and second portions.

The first and second parts when positioned adjacent one another may abut, or preferably mate in telescopic fashion especially for the truncated circular cross-section, e.g., "C" or "D" shape enclosures. All the above enclosures optionally include "apple core" gel cable blocks, for example, item 25 in U.S. Pat. No. 4,944,973, between closely adjacent cables either immediately within the enclosure overlapping the enclosure edges, or abutting the enclosure edge.

BRIEF DESCRIPTION OF THE DRAWINGS

FIG. 1 is a plan view of a splice case.
FIG. 2 is a plan view of a spring.
FIG. 3 is a side elevation of a spring.
FIG. 4 is a perspective view of the spring.
FIG. 5 is a plan view of an alternative splice case.
FIG. 6 is a plan view of another alternative splice case.
FIG. 7 is an exploded perspective view of a splice case illustrating the "C" and "U" edge openings as well as the cable block.

DETAILED DESCRIPTION OF THE INVENTION

The splice case preferably comprises first and second hollow parts of a plastics material, each part having a major base and a plurality of openings in the sides for a plurality of cables but preferably there is one cable per opening. The size of opening provided will depend on the size of the cable (or number of drop wires) that is to enter or leave the case. Each part for the elongate embodiments is preferably less deep than, preferably about half the depth of, its width. Its length is preferably from 2-5, especially from 3-4 times its width, its length being measured to the ends of the tapering portions where provided.

The present spring preferably bears not against edges of the parts but against deformable major surfaces between them, and preferably such that pressure be exerted at more than one point. This may be achieved by the provision of some means to spread the applied force, but preferably such that the spring comprises a first portion that can bear against a major deformable surface of the first part, a second portion that can bear against a major surface of the second part and a third portion that interconnects the first and second portions. The case includes the openings within the third portion. It may be desirable for the first and second portions of the spring to bear against portions of the surfaces remote from edges of the surfaces, since at the edges the surfaces are supported by side walls of the splice case parts. Thus, the portions of the springs may bear against central portions of the major surfaces, or along or close to a center line of the surfaces, where most deformation may be achieved with the smallest force. In many cases it may be desirable that the spring, in addition to holding the parts together, causes only said deformation, or in other words it does not cause bodily movements of the parts together once they have become properly positioned.

The spring is preferably elongate and so shaped that it can be slid, laterally with respect to its length, over the two parts of the splice case such that the first portion of the spring bears against a surface of the first part, the second portion bears against a surface of the second part and the third portion (that interconnects the first and second portions) bridges a join line between the first and second parts. The spring may be shaped by gentle curving (rather than by angular bends), in which case the various portions thereof will not be so clearly differentiated by shape.

The spring preferably comprises an elongate member optionally curved, such as spring steel rod or wire bent to an appropriate shape, such as a plurality of segments each one of which serves to bear against portions of the first and second surfaces of the splice case parts. Thus, the complete spring may exert a force on an internal sealing material through the surfaces at several points.

The spring (or where it comprises a bent wire or rod, an envelope thereof) may have the shape of an elongate channel, substantially u-shaped in transverse cross-section. One or more such channels may be used to hold the splice case parts together. Where two or more channels are used, they may be used end-to-end and both or all slid over a single edge of the splice case or they may face one another, being slid over opposite edges.

The surfaces of the first and second splice case parts may be designed to reduce the force required of the spring, to facilitate proper positioning of the spring, to prevent the spring slipping off once positioned, or otherwise to improve functioning of the splice case. For example, the first and second parts may be of thin-walled material, at least at the major deformable surfaces. The thickness chosen will depend on the material, and for polyethylene or polypropylene, a thickness of from 1 mm–3 mm is preferred. The parts may be locally weakened for example by providing a line of weakness at the deformable major surfaces and preferably centrally located within the major surface. Such a line or lines of weakness may run lengthwise of the splice case for elogate splice cases and aid deformation by springs slid laterally over the longitudinal edges of the case. If desired, corrugations or other areas of expansibility or collapsibility may be provided to allow a substantially rigid portion of the deformable surface to be displaced with respect to the remainder.

The sealing material used preferably has a cone penetration value from 100 to 350 ($10^{-1}$ mm), more preferably 200–260, especially 230–250, and an ultimate elongation of at least 200%. Cone penetration may be chosen to ensure that the material is able to be deformed around the conductors to be sealed avoiding air voids, but without excessive flow or if desired excessive relaxation over time, and the ultimate elongation may be chosen to ensure that on re-entry into the splice case the material is pulled away from the conductors by the parting first and second splice case parts. Cone penetration is measured by ASTM D217-68 at 21° C. on an undisturbed sample using a standard 1:1 scale cone (cone weight 102.5 g, shaft weight 47.5 g), the penetration being measured after 5 seconds. Elongation is measured by ASTM D638-80 at 21° C. using a Type 4 die to cut the sample, and at a speed of 50 cm/minute.

Suitable sealing can be made by gelling curable polyurethane precursor materials in the presence of substantial quantities of mineral oil, a vegetable oil or a plasticizer or a mixture thereof. The amount of plasticizer may be, for example, 30–70% by weight of the total in the case of a plasticizer such as trimellitate, or 60–80% in the case of a mineral or vegetable oil. Mineral and vegetable oils may be mixed, for example in the ratio 0.7–2.4 parts by weight of mineral oil to 1 part by weight of vegetable oil. Other suitable sealing materials may be made by curing reactive silicones with non-reactive, extender, silicones. A further class of materials comprises those formed by extending triblock copolymers, such as styrene-ethylenebutylene-styrene copolymers (for example that sold under the Shell trademark Kraton) with a mineral oil. These sealing materials are disclosed in U.S. Pat. No. 4,634,207 (Debbaut) and U.S. Pat. No. 4,716,183 (Gamarra), the disclosures of which are incorporated herein by reference.

The sealing material may substantially fill the enclosed space dipped by the parts or it may serve merely to seal some part thereof that blocks what would otherwise be a leak path to the outside environment. I prefer that the sealing material contact all damageable surfaces of a substrate placed in the splice case, and the space is preferably therefore substantially filled with sealing material.

An optional organizer, disclosed in U.S. Pat. No. 4,859,809, positionable within the enclosed space defined by the first and second splice case parts. The organizer may serve simply to hold the conductors to be spliced in an orderly fashion making best use of the space available. It may however have other functions such as identification of conductors by position, or in the case of a splice case for optical fibers it may have the function of maintaining the fibers at a desired bend radius.

The organizer preferably comprises at least one comblike member 18, FIG. 7, between the upstanding teeth 19, FIG. 7, of which individual conductors may be laid. Such an organizer is preferably positioned adjacent an outlet of the splice case. An organizer may be present at one end of the splice case to seal a butt splice or at each end two opposite ends to seal an inline splice, etc. A layer of material, for example a sealing material, such as the sealing material mentioned above, may be provided between each layer of conductors. Alternatively, a layer between the conductors may be a foam, for example an open- or closed-cell foam, which may have a sealing function or may serve merely to hold the conductors in place. An open-cell foam may be impregnated with a sealing material, such as that mentioned above, providing the advantage that the foam may be compressed by the springs when the parts of the splice case are brought together thereby putting the sealing material under compression. An initial layer of sealing material or foam may lie under the first layer of conductors. The organizer may be located within the first or second part of the splice case by, for example, means of an extension from a comb-like part thereof. Such extension may have a hole therethrough, through which an extension of the spring passes after passing through a surface of the part. Two or more organizers may be positioned at one or both ends of the splice case, for example fixed to respective parts thereof.

The drawings illustrate several preferred embodiments. FIGS. 1 and 7 show a splice case 1 in plan view, a first hollow part 2 thereof being visible. The first part 2 is held adjacent and preferably telescoped over a similar, but obscured, second part below it by springs 3. First portions 4 of the springs 3 can be seen to bear against a deformable surface of the part 2. The portions 4 are connected to second portions of the spring (that bear on the hidden second part of the splice case) by third portions 5 of the springs. The springs 3 may be located in the parts of the splice case by passing into holes 6 therein. The splice case may have tapered ends 7, end portions of which are cut away to form outlets of the desired size. A plurality of cables 100a thru 100l can enter the Case 1 through suitably sized openings in the edge of the sides. Each hollow part has a "C" or "U" shaped opening, 16 and 15, respectively such that the combination, when the first and second parts mate, is substantially circular. The "C" shape is preferred because the edges provide a retainment means for the cable by more substantially surrounding it. Of course, the case can have fewer openings if fewer cables are to be sealed. Preferably both halves contain the sealing material. When adjacent cables, e.g., 100a and 100b, enter the enclosure, a cable block 8, i.e., an "apple core," is placed to abutt the enclosure, or overlap the interior edges or is placed just within the enclosure, not illustrated. The splice case of FIG. 1 is preferably from 15-40 cms, especially 20-35 cms long, 4-15 cms especially 5-10 cms wide and 2-6 cms especially 3-5 cms deep.

The spring is illustrated in FIGS. 2, 3, and 4. A plan view of a spring is shown in FIG. 2. First portions 4 can be seen. The first portions 4 are connected to second portions, hidden below them, by third portions 5. This can be seen more clearly in FIG. 3 which is a side elevation. First portions 4 are connected to second portions 11 by third portions 5. The "C" or "U" shapes, i.e., reentrant shape, are best illustrated in FIG. 4. The springs may provide some mechanical strength for example impact strength, and the sealing material may contribute by providing damping under impact. For best impact strength, the path of the spring may extend over substantially all of the deformable surface of the parts, i.e. across the width and length of the splice case. Preferably the spacing between runs of a rod-like spring is less than 5 cms, preferably from 1.5-4 cms.

FIGS. 5 and 6 illustrate additional embodiments providing cable access from a flat based 27 and 37 of hollow parts 22 and 32 as well as on the circular periphery. Each case contains springs 23 and 33, respectively, to deform the major illustrated surfaces and seal the cables. The springs 23 and 33 are similar in shape to spring 3 in FIG. 1 but sufficiently curved to fit around the edge of the cases 21 and 31. In these embodiments the bases 27 and 37 preferably contain hinges. At least one hollow part and preferably each hollow part is filled with the gel sealing material and includes the "C" shaped members in the side wall perpendicular to the major surface to form the substantially circular opening for the cables 200a through 200j, and 300a through 300i, respectively. Adjacent cables are blocked with hard gel blocking cores 28a, 28b, and 38a, respectively. In these preferred embodiments the cores are illustrated as overlapping the edges of the enclosures. Optionally, enclosure 31 can also contain cables around its periphery and enclosure 21 need not have cables about its periphery. These "C" or "D" shaped cases telescope within each other such that either the first or second part is a minor image but just small enough to fit within the other hollow part.

The invention has been described with respect to particularly preferred embodiments. Modifications within the spirit my invention by the ordinary skilled artisan are contemplated to be within the scope of the invention.

I claim:

1. A splice case for encapsulating a plurality of cables, which comprises:
   a first hollow part;
   a second part that can be positioned adjacent the first part such that the first and second parts together define an enclosed space, said first and second parts having access ports for cables in the sides perpendicular to a major surface;
   a sealing material having a cone penetration value from 100 to 350 ($10^{-1}$ mm) and an ultimate elongation of at least 200%, the sealing material being within the first hollow part; and
   a spring for forcing the first and second parts together thereby putting the sealing material under compression, when the spring engages the first and second parts, said spring permitting cables to be placed within the enclosure between the portions of the spring shape bearing against the sides of the case substantially perpendicular to the major surface;
   the first part and/or the second part having a deformable major surface, and the spring being so shaped as to cause said major surface to be deformed towards the sealing material thereby putting the sealing material under compression when the spring engages the first and second parts.

2. A splice case according to claim 1, in which the spring has the functions of:
   (a) holding the first and/or second parts within the other part; and
   (b) causing deformation of said major surface of each part.

3. A splice case according to claim 1, in which the spring comprises a plurality of segments each of which can bear against a different part of said surface thereby distributing a compressive force on the sealing material.

4. A splice case according to claim 1, in which said surface has a line of weakness facilitating said deformation.

5. A splice case according to claim 1 further including cable blocking between adjacent cables, said cable blocking overlapping the edges of the enclosure formed by the mating of the first and second parts.

6. A splice case according to claim 1 further including a sealing material in the second hollow part.

7. A splice case according to claim 6 further including cable blocking between adjacent cables, said cable blocking overlapping the edges of the enclosure formed by the mating of the first and second parts.

8. A splice case for encapsulating a conductor splice, which comprises:
   a first hollow part having a straight edge base capable of accepting a plurality of cables and a substantially circular periphery connecting the edges of the base.
   a second part that can be positioned within the first part, such that the first or second parts together define an enclosed space;
   a sealing material having a cone penetration value from 100-350 ($10^{-1}$ mm) and an ultimate elongation of at least 200%, the sealing material being within the first hollow part; and
   a spring for forcing the first and second parts together thereby putting the sealing material under compression, the spring comprising a resilient elongate member shaped as at least three interconnected segments each segment being of re-entrant shape and comprising a first portion that can bear against a surface of the first part, a second portion that can bear against a surface of the second part, and a third portion that interconnects the first and second portions.

9. A splice case according to claim 8 wherein the first part and/or the second part have a deformable surface region centrally located therein.

10. A splice case according to claim 9 further including a sealing material in the second hollow part.

11. A splice case according to claim 10 further including cable blocking between adjacent cables, said cable blocking overlapping the edges of the enclosure formed by the mating of the first and second parts.

12. A splice case according to claim 11 wherein the first and second hollow parts have a "C" or "D" shape.

13. A splice case according to claim 12 further including openings within the periphery adjacent the base to accept additional cables.

14. A splice case according to claim 13 further including cable blocking between adjacent cables entering the enclosure through the periphery.

15. A splice case according to claim 14 wherein the openings for the cables in the edges of the first and second parts have a "C" or "U" shape and together form a substantially circular shape.

16. The splice case according to claim 8 including a conductor organizer including a tubular member for locating the conductor organizer which comprises within either the hollow first part or the hollow second part and the hollow first part and the hollow second part include passages therein to permit the locating and aligning of the tubular member.

17. The splice case according to claim 16 further including a sealing material within the second part.

18. A splice case according to claim 17 further including cable blocking between adjacent cables, said cable blocking overlapping the edges of the enclosure formed by the mating of the first and second parts.

* * * * *